United States Patent
Neely et al.

(10) Patent No.: US 12,479,451 B2
(45) Date of Patent: Nov. 25, 2025

(54) VEHICLE SYSTEMS AND CONTROL LOGIC FOR AUTOMATING MANUFACTURING MODE FOR CONNECTED VEHICLES

(71) Applicant: GM GLOBAL TECHNOLOGY OPERATIONS LLC, Detroit, MI (US)

(72) Inventors: Matthew Neely, Rochester, MI (US); Eric T. Hosey, Rochester Hills, MI (US); Matthew E. Gilbert-Eyres, Rochester Hills, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 18/328,830

(22) Filed: Jun. 5, 2023

(65) Prior Publication Data
US 2024/0400075 A1 Dec. 5, 2024

(51) Int. Cl.
*B60W 50/12* (2012.01)
*B60R 16/023* (2006.01)
*B60R 25/04* (2013.01)
*B60R 25/102* (2013.01)
*B60W 50/08* (2020.01)

(52) U.S. Cl.
CPC ......... *B60W 50/12* (2013.01); *B60W 50/082* (2013.01); *B60W 2710/0677* (2013.01)

(58) Field of Classification Search
None
See application file for complete search history.

(56) References Cited

U.S. PATENT DOCUMENTS

| | | | |
|---|---|---|---|
| 7,483,772 B2 | 1/2009 | Oesterling et al. | |
| 7,890,243 B2 | 2/2011 | Abendroth | |
| 8,731,155 B2 | 5/2014 | Chesnutt et al. | |
| 9,179,311 B2 | 11/2015 | Peirce et al. | |
| 9,440,655 B2 | 9/2016 | Roos et al. | |
| 9,820,124 B1 | 11/2017 | Hosey et al. | |
| 9,865,110 B2 * | 1/2018 | Link, II | H04L 63/08 |
| 10,434,986 B1 | 10/2019 | Gilbert-Eyres et al. | |
| 10,562,492 B2 * | 2/2020 | Joao | B60R 25/33 |

(Continued)

*Primary Examiner* — Jason Holloway
*Assistant Examiner* — Atticus A Cameron
(74) *Attorney, Agent, or Firm* — Quinn IP Law

(57) ABSTRACT

Presented are automated vehicle systems for provisioning manufacturing mode (MM) for connected vehicles, methods for making/using such systems, and wireless-enabled vehicles with MM functionality. A method of controlling operation of a vehicle includes receiving an MM-install signal indicating the vehicle has reached a predefined assembly line location during vehicle assembly. When at this predefined location, the vehicle is installed with an MM operating mode, which contains a predefined spatial limitation, a preset MM start trigger, and an anti-theft protocol. A controller of the vehicle activates the MM operating mode responsive to detecting the vehicle experiencing the preset MM start trigger while within the predefined spatial limitation. With the MM operating mode active, the vehicle controller uses the anti-theft protocol to determine if the vehicle experiences a predefined theft trigger; if so, the controller commands a resident anti-theft system to automate a remediating action to thwart theft of the vehicle.

20 Claims, 2 Drawing Sheets

(56) References Cited

U.S. PATENT DOCUMENTS

| | | |
|---|---|---|
| 11,110,979 B2 | 9/2021 | Watanabe et al. |
| 11,455,870 B2 * | 9/2022 | Conlon .................. G06F 21/88 |
| 2006/0255935 A1 * | 11/2006 | Scalisi ................. G01S 5/0072 |
| | | 340/539.13 |
| 2012/0016558 A1 * | 1/2012 | Ueno ..................... B60R 25/08 |
| | | 701/51 |
| 2021/0037386 A1 | 2/2021 | Oesterling et al. |
| 2021/0165110 A1 | 6/2021 | Neely et al. |
| 2022/0402458 A1 | 12/2022 | Gilbert-Eyres et al. |

* cited by examiner

VEHICLE SYSTEMS AND CONTROL LOGIC FOR AUTOMATING MANUFACTURING MODE FOR CONNECTED VEHICLES

INTRODUCTION

The present disclosure relates generally to motor vehicles with system-automated operating modes. More specifically, aspects of this disclosure relate to systems and methods for configuring a manufacturing mode of operation for connected vehicles.

Current production motor vehicles, such as the modern-day automobile, may be equipped with a network of onboard sensors, electronic controllers, and wireless communications devices to provide automated driving capabilities, navigation assistance, and other vehicle services. In automotive applications, for example, one of the most recognizable types of automated driving features is cruise control mode. Cruise control allows a vehicle operator to set a particular vehicle speed and have the onboard vehicle computer system maintain that speed without the driver operating the accelerator or brake pedals. Next-generation Active Park Assistance (APA) is an automated driving mode in which the vehicle's advanced driver assistance system (ADAS) takes full control of steering, braking, and acceleration to park the vehicle. Another type of automated driving mode is Collision Avoidance Assist (CAA), which detects imminent collision conditions and provides a warning to the driver while also taking preventative action autonomously, e.g., by steering or braking without driver input.

As vehicle processing, communication, and sensing capabilities continue to improve, original equipment manufacturers (OEM) will persist in offering more automated driving capabilities with the aspiration of producing fully autonomous "self-driving" vehicles competent to operate among heterogeneous vehicle types in both urban and rural settings. In addition to advanced driver assistance system features, these vehicles may also offer remote vehicle services that allow a vehicle owner or authorized third party to set, activate, and control various vehicle operating modes, such as remote engine start (RES), remote ignition block (RIB), etc. Long-range connectivity, for example, enables unoccupied vehicles to be keyed on and off, shifted across distinct operating modes, and remotely controlled by a back-office (BO) host service. Some vehicles come equipped with a theft detection system that monitors for a theft event and, when detected, shifts into a theft operating mode that automates preventative features, such as RIB and location tracking.

SUMMARY

Presented herein are automated vehicle systems with attendant control logic for provisioning manufacturing mode for connected vehicles, methods for operating and methods for making such systems, and wireless-enabled vehicles interoperable with such systems to enable manufacturing mode functionality. By way of non-limiting example, systems and methods are presented for configuring a manufacturing mode with selectively configurable operating parameters, start and end trigger events, and vehicle theft mitigation responses. The manufacturing operating mode may employ a multilayer theft protocol that militates against physical modification of the subject "host" vehicle (e.g., removal of antenna, disabling of telematics unit, pulling of vehicle battery, etc.). Manufacturing mode (MM) may also implement passive theft triggers that are designed to detect a theft event without back office or wireless interaction and limit vehicle operation within controlled parameters. MM start and end trigger events may be enabled by persistent verified wireless connection from a preset site, such as a Hypertext Transfer Protocol Persistent Connection (HTTP-PC) broadcast at an assembly plant, shipping yard, dealer lot, etc.

Manufacturing mode may also employ continuous vehicle location tracking, which may be achieved through simultaneous implementation of multiple wireless technologies, such as a cellular communications network, a global navigation satellite system (GNSS), a vehicle-to-everything (V2X) broadcast, short-range ultra-wideband (UWB) network, and like communication protocols. Upon detection of a theft event, the host vehicle may automate theft tracking by broadcasting an alert to nearby vehicles within range of wireless communication, e.g., using an ad-hoc mesh-type local area network (LAN). Vehicle tracking may utilize a host vehicle's sensor array, such as interior and exterior cameras, ultrasonic sensors, RADAR, LiDAR, etc., for live monitoring of a theft event. It may be desirable that vehicle tracking be limited to a preset location, a preset time, a preset proximity to a select location, predefined transport conditions, etc.

Aspects of this disclosure are directed to vehicle control protocols, system control logic, and memory-stored instructions for provisioning manufacturing mode for connected vehicles. In an example, a method is presented for controlling operation of a host vehicle, which has wireless short-range communications (SRC) and/or long-range communications (LRC) devices and a resident or remote controller or module or network of controllers/modules (collectively "controller"). This representative method includes, in any order and in any combination with any of the above and below disclosed options and features: receiving, e.g., via central system controller or a workstation controller of a vehicle assembly line system, an MM-install signal indicating the host vehicle has reached a predefined location on the assembly line during fabrication of the host vehicle; installing. e.g., via the system/workstation controller using a robot cell or a software installation manager, an MM operating mode to the host vehicle when at the predefined assembly line location, the MM operating mode containing one or more predefined spatial limitations, preset MM start and end triggers, and an anti-theft protocol; activating, e.g., via the vehicle controller, the MM operating mode responsive to receiving a trigger signal via the wireless communications device indicating the host vehicle has experienced the preset MM start trigger while within the predefined spatial limitation; determining, e.g., via the vehicle controller using the anti-theft protocol while the MM operating mode is still active, if the host vehicle has experienced a predefined theft trigger indicating occurrence of a theft event; and transmitting, e.g., via the vehicle controller responsive to the occurrence of the theft event, one or more command signals to the host vehicle's resident anti-theft system to automate one or more remediating actions designed to thwart theft of the host vehicle.

Aspects of this disclosure are also directed to computer-readable media (CRM) for provisioning manufacturing mode for connected vehicles. In an example, non-transitory CRM store instructions that are executable by a host vehicle's controller and/or a vehicle assembly line system's controller. When executed, these instructions cause the controllers to perform operations, including: receiving, via the system controller, an MM-install signal indicating the host vehicle has reached a predefined assembly line location in the vehicle assembly line system during assembly of the host vehicle; installing, via the system controller to the host vehicle when at the predefined assembly line location in response to receiving the install MM signal, an MM operating mode containing a predefined spatial limitation, a preset MM start trigger, and an anti-theft protocol; activating, via the vehicle controller, the MM operating mode responsive to receiving via the wireless communications device a trigger signal indicating the host vehicle has experienced the preset MM start trigger while within the predefined spatial limitation; determining, via the vehicle controller using the anti-theft protocol with the MM operating mode active, if the host vehicle has experienced a predefined theft trigger indicating occurrence of a theft event; and transmitting, via the vehicle controller responsive to the host vehicle experiencing the predefined theft trigger, a command signal to a resident anti-theft system of the host vehicle to automate a remediating action configured to thwart theft of the host vehicle.

Additional aspects of this disclosure are directed to connected vehicles with MM vehicle operating mode capabilities. As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, etc. In an example, a vehicle control network interconnects with one or more host vehicles, each of which includes a vehicle body with a passenger compartment, multiple road wheels mounted to the vehicle body (e.g., via corner modules coupled to a unibody or body-on-frame chassis), and other standard original equipment. A vehicle powertrain with a prime mover (e.g., internal combustion engine (ICE) and/or electric traction motor) is attached to the vehicle body and operable to drive one or more of the road wheel to thereby propel the vehicle.

Continuing with the preceding discussion, the vehicle control network also includes at least one vehicle assembly line with a central system controller and/or a network of workstation controllers (collectively "system controller"). The vehicle assembly line's system controller receives an MM-install signal each time a host vehicle reaches a predefined location in the vehicle assembly line. The system controller responds to receipt of an MM-install signal by installing an MM operating mode to each of the host vehicles when that vehicle is at the predefined assembly line location. The MM operating mode contains one or more predefined spatial limitations, preset MM start and end triggers, and an anti-theft protocol. Each vehicle may be equipped with a vehicle controller (e.g., single controller, network of controllers, resident/remote controller(s) or module(s), etc.) that is programmed to receive a trigger signal indicating that vehicle has experienced a preset MM start trigger while within a predefined spatial limitation. In response, the controller automatically activates the MM operating mode. With the MM operating mode active, the vehicle controller uses the anti-theft protocol to determine if the host vehicle has experienced a predefined theft trigger indicating an attempted theft of the vehicle. Responsive to the theft trigger, the vehicle controller automatically commands the host vehicle's resident anti-theft system to automate one or more remediating actions designed to thwart theft of the host vehicle.

For any of the disclosed systems, methods, and CRM, the remediating action to thwart theft of the host vehicle may include the resident anti-theft system automatically activating a stolen vehicle slowdown (SVS) mode that, when activated, gradually reduces an output of the host vehicle's powertrain to thereby slow the vehicle. As another option, the remediating action to thwart vehicle theft may include the resident anti-theft system automatically broadcasting a wireless vehicle-to-vehicle (V2V) beacon with an alert of the theft to one or more third-party vehicles within a preset range of the host vehicle, e.g., to enable real-time vehicle tracking and notify a BO vehicle host service. Optionally, the theft-deterring remediating action may include the vehicle's anti-theft system automatically activating a remote ignition block (RIB) mode that, when activated, prevents keying-on of the host vehicle's prime mover. It may be desirable that each remediating action be automated without notification to or approval from a vehicle occupant.

For any of the disclosed systems, methods, and CRM, activating the MM operating mode may establish a persistent wireless connection (e.g., a mobile ad-hoc networking (MANET) connection) between the host vehicle's wireless communications device and one or more predefined wireless communications devices of a vehicle manufacturer, a vehicle transporter, a vehicle retailer, etc. As another option, activating the MM operating mode may restrict the host vehicle's operating speed to less than or equal to a predefined maximum allowable speed (e.g., 35 MPH within geofenced lot). While not per se limited, the preset MM start trigger may include the host vehicle reaching a predefined end location of the vehicle assembly line (e.g., after general assembly and inspection). In this instance, the trigger signal to activate the MM operating mode may be wirelessly transmitted to the vehicle controller from a central control server or workstation controller of the vehicle assembly line.

For any of the disclosed systems, methods, and CRM, the vehicle controller may receive an end trigger signal indicating the host vehicle has experienced a preset MM end trigger. The preset MM end trigger may include receipt of an authorized interrupt request to disable the MM operating mode. Upon receipt of the authorized interrupt request or other valid preset MM end trigger, the vehicle controller may automatically deactivate the MM operating mode. In this instance, it may be necessary that the vehicle controller or a BO vehicle host service first confirm that the authorized interrupt request or other MM end trigger complies with a predefined set of end criteria before deactivating the MM operating mode. As another option, the predefined theft trigger may include the host vehicle's wireless communications device losing connectivity with a predefined wireless communications device of a vehicle manufacturer, a vehicle transporter, a vehicle retailer, etc. Other potential theft triggers may include unauthorized disabling or wireless disconnection of the vehicle's in-cabin telematics unit, detected damage to a lock cylinder, unauthorized deactivation of the ignition block, unauthorized breach of a vehicle door, etc.

For any of the disclosed systems, methods, and CRM, each MM-install signal is received via a central control server or a designated workstation controller of a vehicle assembly line. As a further option, installing the MM operating mode may include an authorized software installation manager device or comm module uploading an MM software application containing the MM operating mode to a memory device of the host vehicle. Alternatively, installing the MM operating mode may include an automated robotic assembly cell or flex workstation mounting a telematics unit preloaded with the MM software application into the host vehicle. In another option, the predefined spatial limitation of the MM operating mode may include a virtual geofence (e.g., dynamically generated virtual perimeter), a predetermined location (e.g., invisible fence or electronic security fence system), and/or a preset proximity to a location (e.g., GPS or trilateration tracking of host vehicle's real-time location).

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
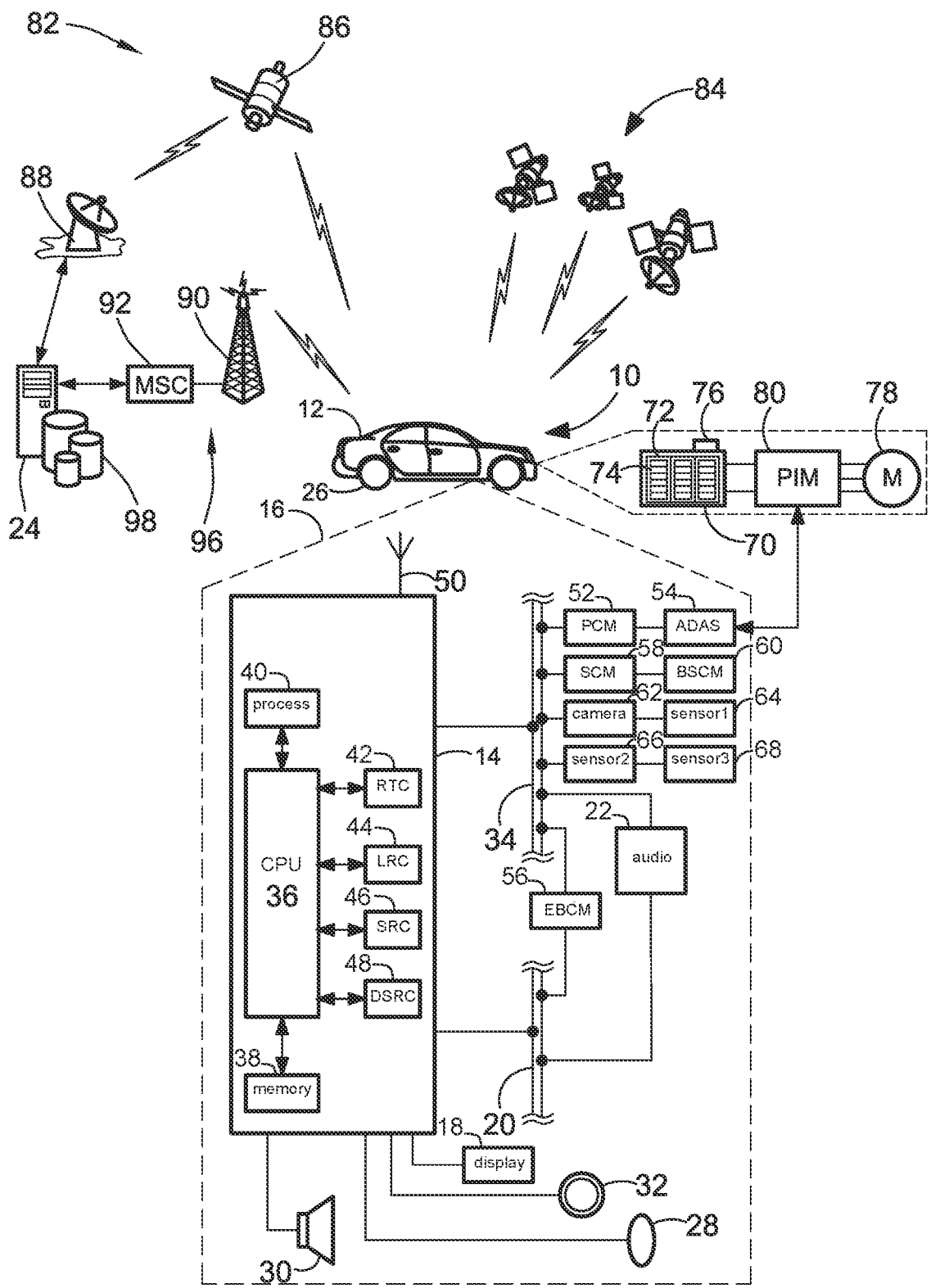
FIG. 1 is a partially schematic, side-view illustration of a representative motor vehicle with a network of in-vehicle controllers, sensing devices, control modules, and communication devices connected to a smart vehicle control system for provisioning a manufacturing mode (MM) of operation in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, recitation of "first", "second", "third", etc., in the specification or claims is not used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into the illustrated wireless communications network for V2X data exchanges for provisioning manufacturing mode (MM) of connected vehicles should also be appreciated as a non-limiting implementation of disclosed features. As such, it will be understood that aspects and features of this disclosure may be applied to other wireless network architectures, implemented in assorted vehicle manufacturing scenarios, and incorporated into any logically relevant type of vehicle. Moreover, only select components of the motor vehicles and vehicle control systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, wireless modem, mesh network, satellite service, etc., with a remotely located back-office (BO), cloud-computing host service 24 (e.g., ONSTAR® or MYGMC®). Some of the other in-vehicle hardware components 16 shown generally in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human-machine interface (HMI) that enables a user to communicate with the telematics unit 14 and other components resident to and remote from the vehicle 10. Microphone 28, for instance, provides occupants with a means to input verbal or other audible commands; the vehicle 10 employs an embedded voice-processing unit utilizing audio filtering, editing, and analysis modules to convert the inputs to signals. Conversely, the speakers 30 provide audible output to a vehicle occupant and may be either a stand-alone speaker dedicated for use with the telematics unit 14 or may be a part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and offboard the vehicle body 12. This allows the vehicle 10 to automate assorted vehicle functions, such as modulating powertrain output, activating friction or regenerative brakes, controlling vehicle steering, managing operation of a traction battery pack, controlling vehicle windows, doors, and lock, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, a multicore processor, an application specific integrated circuit (ASIC), a dedicated control module, or other suitable IC device or network of devices. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC memory device, solid-state drive (SSD) memory, hard-disk drive (HDD) memory, flash memory, semiconductor memory (e.g., various types of RAM or ROM), etc.

Long-range communication (LRC) capabilities with remotely located off-board devices may be provided via one or more or all of a cellular chipset, an ultra-high frequency radio transceiver, a satellite-communication (SATCOM) component (e.g., global positioning system (GPS) transceiver), and/or a wireless modem, all of which are collectively represented at 44 in FIG. 1. Short-range communication (SRC) capabilities may be provided via a close-range communication device 46 (e.g., a BLUETOOTH® unit or near field communications (NFC) transceiver), UWB or LPWAN comm device, a dedicated short-range communications (DSRC) component 48, and/or a dual antenna 50. The communications devices described above may provision data exchanges as part of a periodic broadcast in a vehicle-to-vehicle (V2V) communications network or a vehicle-to-everything (V2X) communications network, e.g., Vehicle-to-Infrastructure (V2I), Vehicle-to-Pedestrian (V2P), Vehicle-to-Device (V2D), etc. It is envisioned that the vehicle 10 may be implemented without one or more of the above listed components or, optionally, may include additional components and functionality as desired for a particular end use.

CPU 36 receives sensor data from one or more sensing devices that use, for example, image detection, radar, laser, ultrasonic, optical, infrared, or other suitable technology, including short-range communications technologies (e.g., DSRC, ad-hoc mesh LAN, BLUETOOTH® or BLE®) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The vehicle's electrified powertrain is generally represented in FIG. 1 by an electric traction motor 78 that is operatively connected to a rechargeable energy storage system (RESS), which may be in the nature of a chassis-mounted traction battery pack 70. The traction battery pack 70 may be generally composed of one or more battery modules 72 each containing a group of electrochemical battery cells 74, such as lithium ion, lithium polymer, or nickel metal hydride battery cells. Traction motor/generator (M) unit 78 draws electrical power from and, optionally, delivers electrical power to the battery pack 70. A power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Also shown in FIG. 1 is a mobile vehicle communications (MVC) system 82 that enables wireless communications between remotely located computing nodes and one or more motor vehicles 10. MVC system 82 is represented herein by a constellation of GPS satellites 84, a wireless services satellite 86, an uplink transmitting station 88, a cellular (cell) transceiver tower 90, and a mobile switching center (MSC) 92. A host vehicle's GPS transceiver 44 may exchange radio signals with the GPS satellites 84 to derive real-time or near real-time geopositional and time data for the vehicle 10, which may be used to provide navigation and other related services to vehicle occupants. Wireless services satellite 86, through cooperative operation with the uplink transmitting station 88, provisions unidirectional and bidirectional communications with the vehicle 10, such as satellite radio and media services (e.g., music, news, videos, etc.) and satellite telephony services (e.g., to contact a remote vehicle command center). While shown with a single vehicle 10 communicating with multiple GPS satellites 84, a single wireless services satellite 86, a single uplink station 88, a single cell tower 90, and a single MSC 92. MVC system 82 may incorporate any number and combination of the foregoing elements as well as other available and hereafter developed communications hardware.

The MVC system 82 may operate within a cellular communications system 96, which is represented in FIG. 1 by one or more cell towers 90, one or more mobile switching centers 92, as well as any other networking components needed to link the cellular communications system 96 with assorted end nodes (e.g., BO host service 24). Each cell tower 90 may be equipped with a respective set of sending and receiving antennas for exchanging radio signals with vehicles 10. Base stations of the different cell towers may be connected to the MSC 92 either directly or via intermediary equipment, such as a base station controller (not shown). The cellular communications system 96 may implement any suitable communications technology, including earlier cellular protocols, such as cellular digital packet data (CDPD) 2G technologies, or contemporary cellular protocols, such as 4G-LTE of 5G-Advanced technologies. Vehicle telematics unit 14 may function as a cellular-enabled mobile component that is registered with a cellular carrier to transmit network data packets to and from the cellular communications system 96. It should be appreciated that the system 96 may take on innumerable tower/station/MSC arrangements, including co-location of a base station and a cell tower at the same site, remotely locating base stations and cell towers from one another, a single base station servicing a single cell tower, a single cell servicing multiple cell towers, and coupling multiple base stations to a single MSC, to name but a few possible arrangements.

After a motor vehicle "rolls off" an assembly line, e.g., upon completion of general assembly and inspection, it may be placed in storage at a manufacturer's warehouse or parking lot, handed off to an authorized shipping company, or kept on-lot at a designated dealership. It has now become all too common for a vehicle to be stolen directly from the assembly plant, holding warehouse, dealership lot, shipping company, etc., prior to the vehicle being sold to a customer. Would-be thieves now use wireless-enabled software tools to clone remote keyless system (RKS) access nodes and concomitantly subvert resident anti-theft systems (ATS) to break into the vehicle. Using illicit diagnostic tools purchased on the black market, thieves are now able to deactivate the vehicle's ignition lock system while disabling the telematics unit and any attendant wireless connectivity to prevent vehicle tracking and remote ignition block.

Presented below are systems and methods for provisioning a Manufacturing Mode (MM) of operation for connected vehicles that proactively initializes a system-automated vehicle state that is designed to thwart vehicle theft events. When MM vehicle operating mode is active, the subject "host" vehicle may employ multiple wireless technologies (V2X, UWB, DSRC, GNSS, etc.) to continuously or periodically monitor for a wireless "heartbeat" signal broadcast from a designated transmitter module/comm device of an assembly plant, holding warehouse, dealership, etc. Loss of a persistent back-office connection, e.g., for at least a predefined signal loss threshold (e.g., three (3) minute refresh rate), automates activation of an anti-theft protocol that enables one or more stolen vehicle services. A vehicle-specific Manufacturing Mode profile may be created, e.g., for each vehicle make/model/trim, with several selectively configurable parameters calibrated to that vehicle: (1) set spatial limitations (e.g., geofencing assembly plant and lot); (2) set audible and visual theft cues (e.g., automated flashing of vehicle headlamps and taillamps, beeping of vehicle horn, etc.); (3) set speed limiting thresholds (e.g., max vehicle speed of 25 miles per hour (mph) within geofence); (4) set continuous vehicle location tracking parameters (e.g., persistent wireless connection via cellular, V2X, GNSS, UWB, other); and (5) set theft-remediating response (e.g., autonomous Return-to-Home (R2H) mode, remote ignition block (RIB) mode, stolen vehicle slowdown (SVS) mode, other).

Multiple modalities may be enabled and disabled via a designated employee or other authorized party to configure start and end triggering events for Manufacturing Mode. As some non-limiting examples, these modalities may include, singly and in any combination: (1) host vehicle paired with preset location; (2) vehicle make/model/trim/type; (3) plant location; (4) geofence; (5) predefined final destination; (6) predefined holding lot; (7) predefined shipping date/location/party; (8) key provisioning; (9) host vehicle services account creation; and (10) device registration. If a theft event does take place while the vehicle is operating in Manufacturing Mode, a set of configurable events may be automated as part of an automated "dragnet" mode: (1) stealth call to BO with alert of MM theft event; (2) enable cellular SIM when vehicle in unsold state prior to customer taking ownership of vehicle; (3) auto RIB if wireless signal loss with vehicle in predefined geofence; (4) auto SVS if wireless signal loss with vehicle outside of predefined geofence; and/or (5) broadcast MM theft beacon to wireless-enabled vehicles within range of theft event to begin vehicle-to-vehicle tracking. Other available options for dragnet mode may include utilizing V2X to scan and transmit a host vehicle's VIN to help locate the stolen vehicle, and to enable exterior vehicle cameras to look for make/model/color of vehicle.

Figure 2:
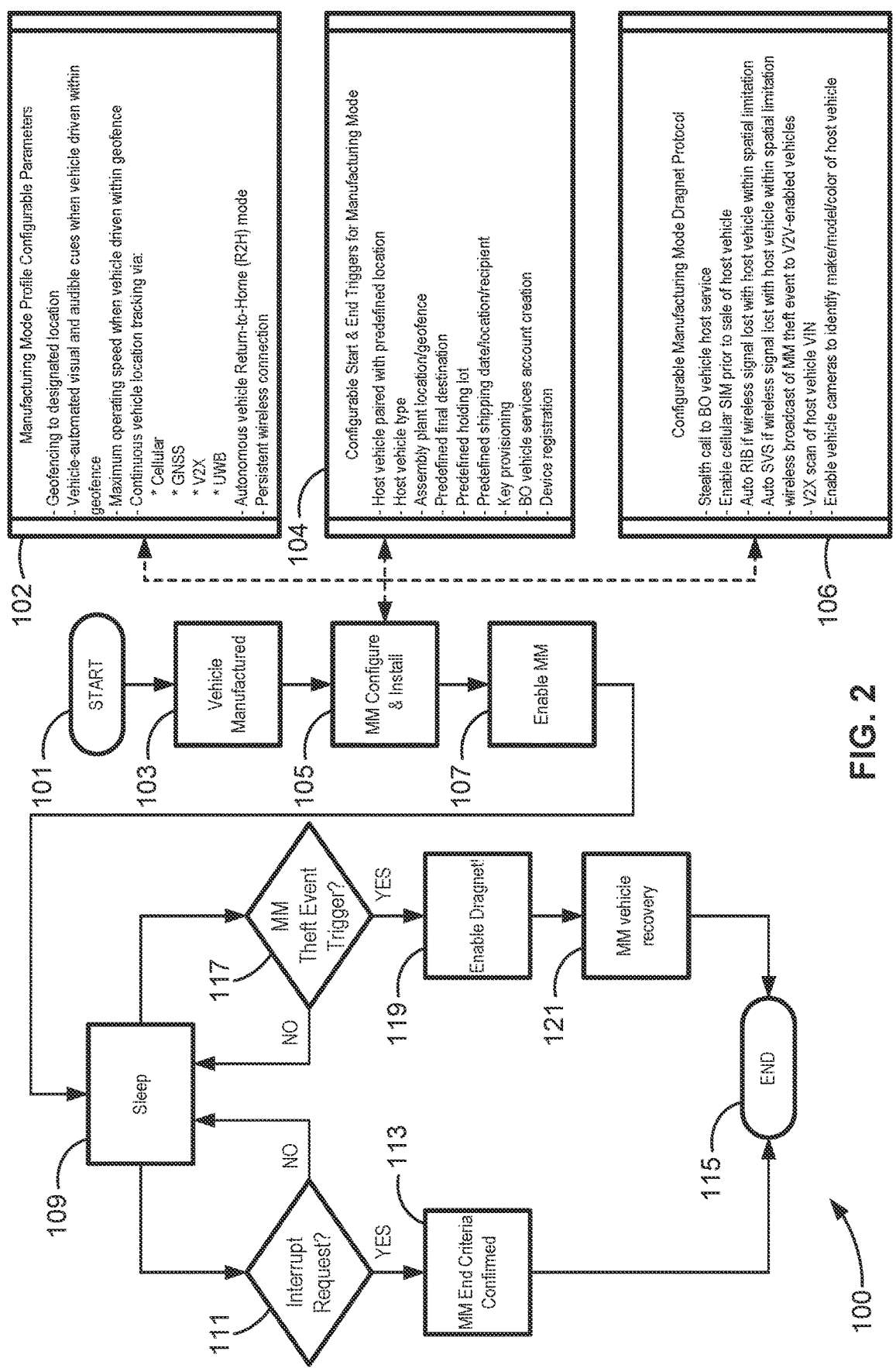
FIG. 2 is a flowchart illustrating a representative vehicle control method for configuring and executing manufacturing mode for a host vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for provisioning an MM vehicle operating mode for a connected host vehicle, such as automobile 10 of FIG. 1, is generally described at 100 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., vehicle memory device 38 and/or host server database 98 of FIG. 1), and executed, for example, by an electronic controller, processing unit, dedicated control module, logic circuit, or other module or device or network of controllers/modules/devices (e.g., vehicle CPU 36 and/or BO host service 24 server of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 100 begins at START terminal block 101 of FIG. 2 with memory-stored, processor-executable instructions for a programmable controller or control module or network of controllers/modules to call up an automated MM installation and activation procedure for a connected vehicle. This routine may be executed in real-time, near real-time, continuously, systematically, sporadically, and/or at regular intervals, for example, each 10 or 100 milliseconds during and after manufacture of the motor vehicle 10. As yet another option, terminal block 101 may initialize responsive to a user command prompt (e.g., via telematics input controls 32), a resident vehicle controller prompt (e.g., from CPU 36), or a broadcast prompt signal received from a centralized backend vehicle services system (e.g., from BO host service 24). By way of non-limiting example, method 100 may automatically initialize as part of a central server computer of a vehicle assembly line system launching assembly operations for a given plant shift. Upon completion of some or all of the control operations presented in FIG. 2, method 100 may advance to END terminal block 115 and temporarily terminate or, optionally, may loop back to terminal block 101 and run in a continuous loop.

Advancing from terminal block 101 to VEHICLE MANUFACTURED data input block 103, method 100 executes memory-stored instructions to confirm that a subject vehicle has reached a designated juncture in the manufacturing process for installation of the MM vehicle operating mode into that vehicle. By way of example, and not limitation, the plant's central server computer may actively track vehicle progress for all vehicles on the assembly line to determine when each vehicle arrives at the assembly line workstation assigned to install the MM software package. As another option, a discrete processor at the assigned assembly line workstation may detect each time a new vehicle has arrived at that workstation for installation of the MM software package. It is also envisioned that data input block 103 may be omitted from method 100; MM installation may be carried out at any logical point in the assembly process or be subsumed as an integral part of an existing process and, thus, does not require active tracking.

Upon confirming that a subject vehicle is ready for MM installation (Block 103), method 100 automates installation of the requisite MM software package into the vehicle, as indicated at MM CONFIGURE & INSTALL predefined process block 105. Rather than implement a "one-size-fits-all" design, the central server database of the assembly plant may contain an assortment of available MM operating modes, each of which may be calibrated to a specific vehicle make, model, year, and/or trim. Once the appropriate MM operating mode is selected, the system/workstation controller may command a robotic assembly cell to physically install into the host vehicle a telematics unit or non-transitory memory device that is preloaded with the selected MM software. Alternatively, the system/workstation controller may command a software installation manager (program or device) to establish a wired or wireless connection with the host vehicle and, once operatively coupled, upload the MM software package to the host vehicle's previously installed telematics unit or another suitable in-vehicle memory device.

For MM Configure & Install at predefined process block 105, the host vehicle may be assigned a vehicle-specific MM profile 102 that contains any one or more of various sets of configurable parameters. These configurable parameters may include: (1) a set of spatial limitations (e.g., geofencing to designated location); (2) vehicle-automated visual and audible cues (e.g., activating vehicle horn and/or lights) for alerting when the host vehicle is being operated (e.g., first set of cues for authorized use within geofence, second set of cues for unauthorized use inside and/or outside geofence); (3) system-restricted operating parameters (e.g., first maximum speed for authorized use within geofence, second maximum speed for unauthorized use inside and/or outside geofence); (4) continuous vehicle location tracking (e.g., cellular trilateration for authorized use within geofence, combination tracking using cellular, GNSS, V2X and/or UWB for unauthorized use outside geofence); (5) approve/deny/setup autonomous R2H mode; and/or (6) configure persistent wireless connection parameters. It is also within the scope and spirit of this disclosure that a default MM profile be implemented; if desired, the default profile may be made adaptable on a vehicle-by-vehicle or vehicle type-by-vehicle type basis.

Another available option for MM Configure & Install (Block 105) may include creating a vehicle-specific MM trigger set 104 that designates one or more authorized start triggers and/or one or more authorized end triggers for automated activation and deactivation, respectively, of the MM operating mode. These configurable operating parameters may include: (1) MM activation/deactivation when host vehicle validly paired/unpaired with predefined location; (2) MM activation/deactivation calibrated to host vehicle type (e.g., make, model, trim, year, etc.); (3) MM activation/deactivation when real-time location of host vehicle is validly inside/exiting from a predefined plant/lot/warehouse/location/geofence; (4) MM deactivation upon arrival at predefined final destination; (4) MM deactivation upon authorized exit from predefined plant/lot/warehouse/location/geofence; (5) MM deactivation at predefined shipping date/location/recipient; (6) MM deactivation for authorized key provisioning; (7) MM activation/deactivation selected during BO vehicle services account creation; and/or (9) MM activation/deactivation selected during device registration. It is also within the scope and spirit of this disclosure that a default set of MM activation and deactivation triggers be implemented; if desired, the default triggers may be made adaptable on a vehicle-by-vehicle basis or vehicle type-by-vehicle type basis.

MM Configure & Install may also include creating a vehicle-specific MM dragnet protocol 106 that designates one or more controller-automated remediating actions to prevent theft of the host vehicle. In accord with the illustrated example, these configurable operating parameters may include: (1) enabling automated notification to BO vehicle host service (e.g., stealth call to ONSTAR® personnel with relevant vehicle information); (2) enabling activation of host vehicle's cellular Subscriber Identification Module (SIM) prior to authorized sale/final delivery of host vehicle; (3) enabling auto RIB (e.g., controller activation of RIB if wireless signal lost with host vehicle while within spatial limitation(s)); (4) enabling auto SVS (e.g., controller activation of SVS if wireless signal lost with host vehicle while within spatial limitation(s)); (5) enable wireless transmission of MM theft event to nearby V2V-enabled vehicles (e.g., host vehicle broadcasts DSRC beacon to all compatible vehicles within approximately one (1) kilometer (km) of stolen host); (6) coordinating V2X scan and reporting of stolen host vehicle VIN; and/or (7) coordinating use of third-party vehicle cameras to identify make/model/color/etc. of stolen host vehicle. It is also within the scope and spirit of this disclosure that a default MM dragnet protocol be implemented; if desired, the default dragnet protocol may be made adaptable on a vehicle-by-vehicle basis or vehicle type-by-vehicle type basis.

After successfully configuring and installing MM to the host vehicle, method 100 proceeds to ENABLE MM process block 107 to automate activation of the MM vehicle operating mode. For at least some implementations, one of the authorized MM start triggers contained in the MM trigger set 104 for activating MM on the host vehicle may include the host vehicle reaching a predefined location of the vehicle assembly line. In a non-limiting example, manufacturing mode may be automatically activated when the host vehicle "rolls off" the assembly line, e.g., after general assembly and inspection but before storage or shipping. It may be desirable, albeit not required, that enabling MM at block 107 of FIG. 2 be an automated process and may depend on a state of drivability of the subject vehicle. In other words, the MM operating mode may be activated as soon as the host vehicle is capable of being stolen (i.e., assembled with a functioning powertrain and final drive system). It is also envisioned that manufacturing mode may be "manually" activated by authorized personnel and/or controller-activated by a central server computer or designated MM control module of the assembly plant. Moreover, MM activation may be activated at any time after vehicle assembly and before final vehicle sale.

Once manufacturing mode is activated, the method 100 of FIG. 2 may temporarily enter a low-power sleep mode that lasts a predefined wait time (e.g., ten (10) minute refresh rate) at MM SLEEP process block 109. Upon completion of the predefined wake time, a central server computer or vehicle manager device may wirelessly transmit an electronic ping to the telematics CPU or other designated controller or control module of each selected host vehicle; this electronic ping may cause the telematics unit/controller/module to transition from a sleep mode to an awake mode. After selectively waking the host vehicle, the server computer/manager device may retrieve stored data from the host, read and delete data from the host's resident memory, and then sleep the host vehicle for another predefined wait time. Alternatively, the host vehicle may maintain a continuous sleep mode until "awoken" by any one of multiple predetermined wake triggers, such as the end, interrupt, and theft triggers described herein. It is also envisioned that process block 109 may be omitted altogether such that the host vehicle, while in manufacturing mode, systematically monitors for an interrupt request, theft event, or other valid trigger.

With continuing reference to FIG. 2, method 100 may advance from process block 109 to INTERRUPT REQUEST decision block 111 to determine whether or not the host vehicle has received a request to deactivate MM, which may result from the host experiencing at least one preset MM end trigger. As noted above in the discussion of MM Configure & Install, the host vehicle may store in resident memory an MM trigger set 104 that contains one or more authorized end triggers for automated deactivation of manufacturing mode. One of the available examples includes automated deactivation of manufacturing mode responsive to the host vehicle being validly unpaired or otherwise communicatively disconnected from the server computer or manager device of the predefined MM location (e.g., holding lot, plant warehouse, dealership lot, geofenced facility, etc.). As another option, MM may be deactivated in response to the authorized exit of the host vehicle from the predefined MM location. A third non-limiting example may include deactivation of MM mode in response to the host vehicle arriving at an authorized vehicle dealership or ownership of the host vehicle being transferred to a customer. An end trigger may include any one of multiple authorized interrupt requests to disable MM operating mode. Deactivation of the MM vehicle operating mode may demand use of a portable security key (e.g., handheld, BLUETOOTH® ready security key fob) or a stationary peripheral security token (e.g., located at a security checkpoint) that stores at least one electronic security file (e.g., key ID, validated password, cryptographic key, and/or personal identification number (PIN)).

In response to a determination that the host vehicle has not received a request to deactivate manufacturing mode (Block 111=NO), method 100 may loop back to process block 109 and continue to monitor for or await receipt of a valid interrupt request or a theft event trigger. Conversely, method 100 may respond to experiencing an MM end trigger or otherwise receiving an MM deactivation request (Block 111=YES) by executing REQUEST AUTHENTICATION predefined process block 113 to corroborate that the deactivation request and any attendant MM end trigger meets one or more end criteria. Continuing with the examples presented in the preceding paragraph, a request to communicatively disconnect from the server computer or manager device of the predefined MM location may first necessitate request validation and approval by the server computer/manager device. Likewise, a request to exit of the host vehicle from the predefined MM location may first necessitate request authentication and approval by the server computer/manager device. In the same vein, MM deactivation upon arrival of the host vehicle at a vehicle dealership or transfer of the host vehicle to a customer may first necessitate authentication and approval. After the MM end criteria is confirmed at process block 113, method 100 may proceed to END terminal block 115 and temporarily terminate.

Prior to, contemporaneous with, or after monitoring for a valid MM deactivation request at process block 111, method 100 may execute THEFT TRIGGER decision block 117 to determine whether or not the host vehicle has received a signal indicative of an unauthorized taking of the host vehicle, which may result from the host experiencing at least one preset theft trigger. One of the available examples of a predefined theft trigger includes detecting the host vehicle being illicitly unpaired or otherwise communicatively disconnected from the server computer or manager device of the predefined MM location. Upon expiration of the predefined wait time of MM SLEEP process block 109, for example, the host vehicle's telematics unit may wake and search for a wireless signal from or a wireless exchange with the assembly plant. If a signal cannot be detected or a data exchange cannot be completed, for example, within a preset threshold trigger time (e.g., two (2) minutes), the host vehicle may conclude that a theft event has occurred. If the host vehicle loses wireless connectivity from the assembly plant or geofenced location, an unauthorized taking signal may be sent to the vehicle telematics unit indicative of the triggering of an MM theft event. In response to a determination that the host vehicle has not received an indication of a theft event (Block 117=NO), method 100 may loop back to process block 109 and continue to monitor for or await receipt of a valid interrupt request or a theft event trigger.

Method 100 of FIG. 2 may respond to the host vehicle experiencing an MM theft event trigger or otherwise receiving an indication of a theft event (Block 117=YES) by executing DAGNET ACTIVATION predefined process block 119 to enable one or more remediating actions dictated by an anti-theft protocol within the MM vehicle operating mode. As noted above in the discussion of MM Configure & Install, the host vehicle may store in resident memory an MM dragnet protocol 106 that contains one or more configurable operating parameters that may be automated to prevent or stop theft of the host vehicle. Continuing with the preceding example, if the host vehicle's telematics unit is unable to establish a wireless connection with the assembly plant server computer after two minutes of repeated attempts, the telematics unit may automate a stealth call to a BO vehicle host service notifying them of the detected theft event, activate RIB to preclude keying-on of the vehicle's prime mover, and automate one or more audible and visual theft cues to notify parties in the immediate vicinity of the host vehicle that a theft event is taking place. At VEHICLE RECOVERY process block 121, the method 100 may attempt to automate recovery of the host vehicle, e.g., by concurrently activating SVS mode and R2H mode. Method 100 may subsequently proceed to terminal block 115 and terminate.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling operation of a host vehicle having a vehicle controller and a wireless communications device, the method comprising:
   receiving a manufacturing mode (MM) install signal indicating the host vehicle has reached a predefined assembly line location in an assembly line during assembly of the host vehicle;
   installing, to the host vehicle responsive to receiving the MM install signal indicating the host vehicle reached the predefined assembly line location in the assembly line, an MM operating mode containing a predefined spatial limitation relative to a manufacturing facility, a preset MM start trigger, and an anti-theft protocol;
   activating, via the vehicle controller, the MM operating mode responsive to receiving a start indicator signal indicating the host vehicle has experienced the preset MM start trigger while within the predefined spatial limitation relative to the manufacturing facility;
   determining, via the vehicle controller using the anti-theft protocol with the MM operating mode active, if the host vehicle has experienced a predefined theft trigger; and
   transmitting, via the vehicle controller responsive to the host vehicle experiencing the predefined theft trigger, a command signal to a resident anti-theft system of the host vehicle to automate a remediating action configured to thwart theft of the host vehicle.

2. The method of claim 1, wherein the remediating action to thwart theft of the host vehicle includes the resident anti-theft system automatically activating a stolen vehicle slowdown (SVS) mode to reduce or stop an output of a powertrain of the host vehicle and thereby slow the host vehicle.

3. The method of claim 1, wherein the remediating action to thwart theft of the host vehicle includes the resident anti-theft system automatically broadcasting a wireless vehicle-to-vehicle (V2V) beacon with an alert of the theft to one or more third-party vehicles within a preset range of the host vehicle.

4. The method of claim 1, wherein the remediating action to thwart theft of the host vehicle includes the resident anti-theft system automatically activating a remote ignition block (RIB) mode operable to prevent activation of a prime mover in a powertrain of the host vehicle.

5. The method of claim 1, wherein activating the MM operating mode: (1) establishes a persistent wireless connection between the wireless communications device of the host vehicle and a remote wireless communications device of a vehicle manufacturer, a vehicle transporter, or a vehicle retailer; and (2) continually detects for a wireless beacon output by the remote wireless communications device.

6. The method of claim 1, wherein activating the MM operating mode limits a vehicle speed of the host vehicle to less than or equal to a predefined maximum allowable speed.

7. The method of claim 1, wherein the preset MM start trigger includes reaching a predefined end location of a vehicle assembly line, and wherein the start indicator to activate the MM operating mode is sent to the vehicle controller over the wireless communications device from a central control server or a workstation controller of the vehicle assembly line.

8. The method of claim 1, further comprising:
   receiving an end indicator indicating the host vehicle has experienced a preset MM end trigger including an authorized interrupt request to disable the MM operating mode; and
   deactivating, via the vehicle controller responsive to receiving the authorized interrupt request, the MM operating mode.

9. The method of claim 8, further comprising determining if the authorized interrupt request complies with a predefined set of end criteria, wherein deactivating the MM operating mode is further in response to the authorized interrupt request complying with the predefined set of end criteria.

10. The method of claim 1, wherein the predefined theft trigger includes the wireless communications device losing connectivity with a predefined wireless communications device of a vehicle manufacturer, a vehicle transporter, or a vehicle retailer.

11. The method of claim 1, wherein the MM install signal is received via a central control server or a workstation controller of a vehicle assembly line.

12. The method of claim 1, wherein installing the MM operating mode includes uploading an MM software application with the MM operating mode to a memory device of the host vehicle or mounting a telematics unit preloaded with the MM software application into the host vehicle.

13. The method of claim 1, wherein the predefined spatial limitation includes a virtual geofence, a predetermined location, and/or a preset proximity to a location.

14. Non-transitory, computer-readable media storing instructions executable by a vehicle controller of a host vehicle and/or a system controller of a vehicle assembly line system, the host vehicle including a wireless communications device, the instructions, when executed, causing the vehicle controller and/or the system controller to perform operations comprising:
receiving, via the system controller, a manufacturing mode (MM) install signal indicating the host vehicle has reached a predefined assembly line location in the vehicle assembly line system during assembly of the host vehicle;
installing, via the system controller to the host vehicle when at the predefined assembly line location in response to receiving the MM-install signal, an MM operating mode containing a predefined spatial limitation relative to a manufacturing facility, a preset MM start trigger, and an anti-theft protocol;
activating, via the vehicle controller, the MM operating mode responsive to receiving via the wireless communications device a start trigger signal indicating the host vehicle has experienced the preset MM start trigger while within the predefined spatial limitation relative to the manufacturing facility;
determining, via the vehicle controller using the anti-theft protocol with the MM operating mode active, if the host vehicle has experienced a predefined theft trigger indicating occurrence of a theft event; and
transmitting, via the vehicle controller responsive to the host vehicle experiencing the predefined theft trigger, a command signal to a resident anti-theft system of the host vehicle to automate a remediating action configured to thwart theft of the host vehicle.

15. A vehicle control network, comprising:
a vehicle assembly line system including a vehicle assembly line and a system controller, the system controller being programmed to:
receive manufacturing mode (MM) install signals each indicating when one of multiple host vehicles has reached a predefined assembly line location in the vehicle assembly line during assembly of the host vehicles; and
in response to receiving each of the MM-install signals, install an MM operating mode to each of the host vehicles when at the predefined assembly line location, the MM operating mode containing a predefined spatial limitation relative to the manufacturing facility, a preset MM start trigger, and an anti-theft protocol; and
a host vehicle including a vehicle controller, a wireless communications device, and a resident anti-theft system, the vehicle controller being programmed to:
responsive to receiving, via the wireless communications device, a start trigger signal indicating the host vehicle has experienced the preset MM start trigger while within the predefined spatial limitation, activate the MM operating mode;
with the MM operating mode active, use the anti-theft protocol to determine if the host vehicle has experienced a predefined theft trigger indicating occurrence of a theft event; and
responsive to the host vehicle experiencing the predefined theft trigger, command the resident anti-theft system to automate a remediating action configured to thwart theft of the host vehicle.

16. The vehicle control network of claim 15, wherein the remediating action to thwart theft of the host vehicle includes the resident anti-theft system automatically:
activating a stolen vehicle slowdown (SVS) mode operable to reduce or stop an output of a powertrain of the host vehicle and thereby slow the host vehicle;
broadcasting a wireless vehicle-to-vehicle (V2V) beacon with an alert of the theft to one or more third-party vehicles within a preset range of the host vehicle; and/or
activating a remote ignition block (RIB) mode operable to prevent activation of a prime mover in a powertrain of the host vehicle.

17. The vehicle control network of claim 15, wherein activating the MM operating mode limits a vehicle speed of the host vehicle to less than or equal to a predefined maximum allowable speed.

18. The vehicle control network of claim 15, wherein the vehicle controller is further programmed to:
receive an end signal indicating the host vehicle has experienced a preset MM end trigger including an authorized interrupt request to disable the MM operating mode; and
responsive to receiving the authorized interrupt request, deactivate the MM operating mode.

19. The vehicle control network of claim 15, wherein the preset MM start trigger includes reaching a predefined end location of the vehicle assembly line, and wherein the start trigger signal to activate MM operating mode is sent to the vehicle controller over the wireless communications device from the system controller, the system controller including a central control server or a workstation controller of the vehicle assembly line system.

20. The vehicle control network of claim 15, wherein the predefined theft trigger includes the wireless communications device of the host vehicle losing connectivity with a predefined wireless communications device of a vehicle manufacturer, a vehicle transporter, or a vehicle retailer.

* * * * *